US012088402B2

(12) United States Patent
Burns et al.

(10) Patent No.: US 12,088,402 B2
(45) Date of Patent: Sep. 10, 2024

(54) SERVICE CONNECTING ANTENNAS TO REMOTE REGIONS

(71) Applicant: Amazon Technologies, Inc., Seattle, WA (US)

(72) Inventors: Nathan Burns, St. Louis, MO (US); Kevin Cheek, Herndon, VA (US); Michelle Lynn Dobbs, Denver, CO (US); Matthew Sterling Leese, Springfield, VA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 17/872,852

(22) Filed: Jul. 25, 2022

(65) Prior Publication Data

US 2022/0360322 A1 Nov. 10, 2022

Related U.S. Application Data

(62) Division of application No. 16/880,681, filed on May 21, 2020, now Pat. No. 11,405,098.

(51) Int. Cl.
*H04B 7/185* (2006.01)

(52) U.S. Cl.
CPC .............................. *H04B 7/18513* (2013.01)

(58) Field of Classification Search
CPC .......... H04B 7/18513; H04B 7/18539; H04W 16/04; H04W 16/10; H04W 16/18; H04W 28/08; H04W 72/02; H04W 72/04; H04W 72/0406; H04W 72/0446; H04W 72/00
See application file for complete search history.

(56) References Cited

U.S. PATENT DOCUMENTS

| 2005/0043031 | A1* | 2/2005 | Cho ...................... H04L 1/0026 455/450 |
| 2018/0316429 | A1* | 11/2018 | Barritt .................. H04B 10/118 |
| 2020/0314220 | A1* | 10/2020 | Segev ..................... H04L 47/31 |

* cited by examiner

*Primary Examiner* — Fred A Casca
(74) *Attorney, Agent, or Firm* — Klarquist Sparkman, LLP

(57) ABSTRACT

A Data Delivery Service (DDS) is described, which is a service in a multi-tenant environment that transmits satellite data between a satellite antenna and a user instance. The DDS transports the antenna data to a different region, which allows a user to reuse their infrastructure for multiple antenna sites, thereby, reducing their infrastructure footprint and costs. Gateway instances can be launched at scheduled times in different regions and a secure communication channel can be established between the gateway instances to establish inter-region communication.

19 Claims, 10 Drawing Sheets

SERVICE CONNECTING ANTENNAS TO REMOTE REGIONS

CROSS-REFERENCE TO RELATED APPLICATION

This a divisional of U.S. application Ser. No. 16/880,681, filed May 21, 2022, which application is incorporated herein in its entirety.

BACKGROUND

Satellites are increasingly employed by various independently operating entities (e.g., businesses, universities, or governments) for applications such as weather, surface imaging, communications, data transmission, space measurements, geosynchronous positioning, etc. In many examples, the owner or operator of the satellite is primarily concerned with the payload operation (e.g., the function performed by the satellite), which generally requires establishing a communication link between a satellite ground station and the orbiting satellite for transmission of data therebetween.

The owner or operator of a given satellite may exchange data with the satellite via an antenna that is local to the ground station. Servicing communication requests from owners and operators of multiple satellites with a single ground station antenna may quickly fill available communication time, leading to delays in servicing the requests, however, building additional antennas and/or ground stations may be costly and/or resource intensive.

Communication between antennas and remote regions has been particularly problematic as long-distance communications may be less secure and more easily compromised.

DETAILED DESCRIPTION

Inter-region communications of satellite data can be compromised due to security of long-distance communications. Additionally, previous architectures required users that wanted to use a ground station in a region, to setup a receiver stack (various layers of software that function together to enable communication channels) in that same region to receive the data. A Data Delivery Service (DDS) is described, which is a service in a multi-tenant environment that transmits digitized radio-frequency (RF) and/or demodulated and decoded data between a satellite antenna and a user instance. The DDS transports the antenna data to a different region, which allows a user to reuse their infrastructure for multiple antenna sites, thereby, reducing their infrastructure footprint and costs. Gateway instances can be launched at scheduled times in different regions and a secure communication channel can be established between the gateway instances to establish inter-region communication.

Figure 1:
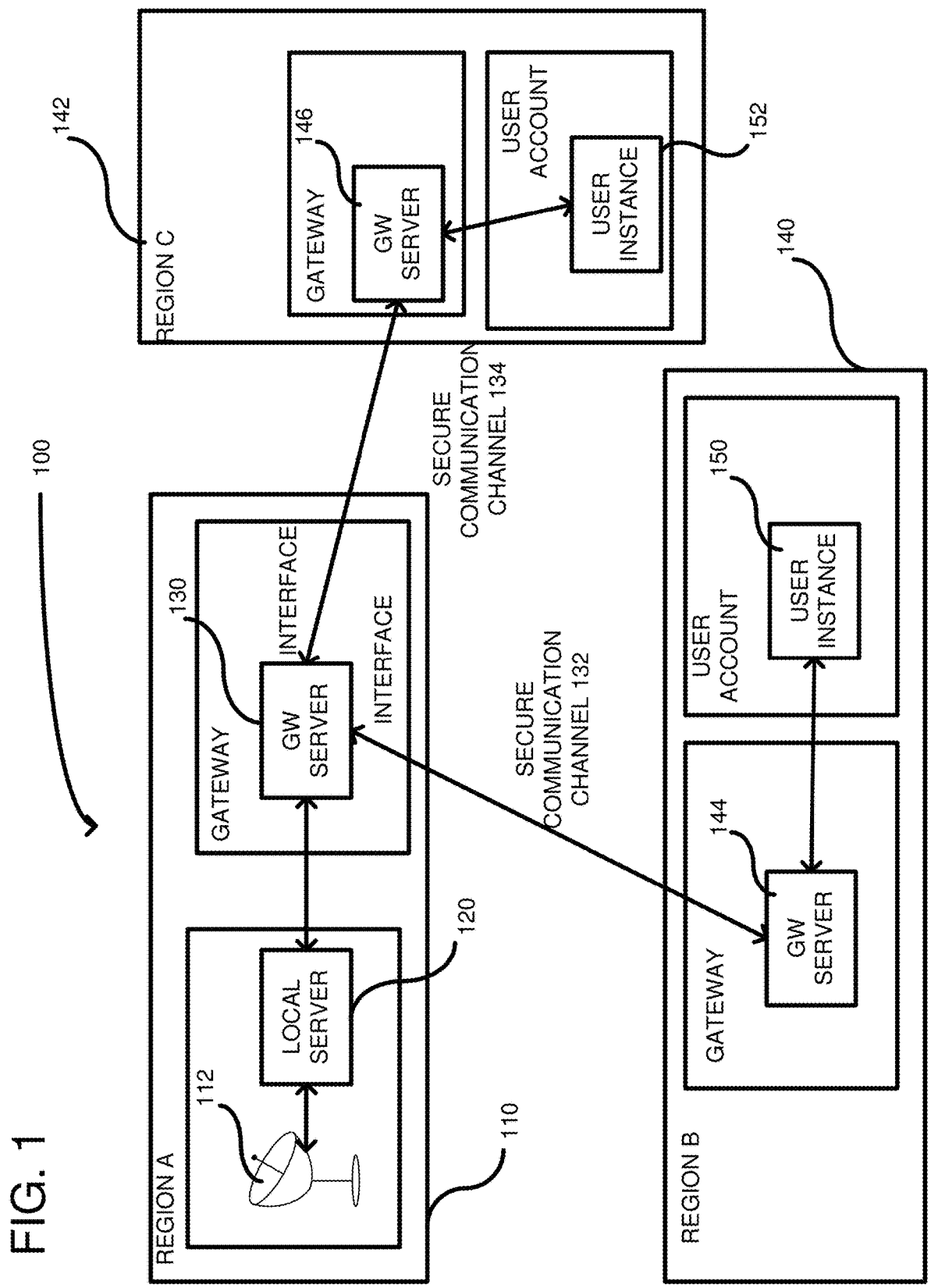
FIG. 1 is an exemplary system according to one embodiment used for communication between an antenna and remote regions.

FIG. 1 shows a system 100 for securely transmitting data between regions in a multi-tenant environment. A region is generally considered a geographic area, such as a country, a state or a city. Thus, to transmit data between regions means to transmit to geographically distant countries, states, localities or cities that are interconnected through a network (not shown). A region may or may not correspond to a portion of a cloud-computing system that is designated as a "region". A region A 110 is a region that has access to an antenna 112, which communicates with a satellite (not shown). The antenna 112 can have a communication channel with a local server 120 or other dedicated hardware or software for transmission of a data stream. The data stream from the antenna 112 can be an encoded User Datagram Protocol (UDP) stream of frames (or RF/IF) that is received by a port of the local instance 120. Software executing on the server 120 can include software to manage, control and monitor the antenna 112 so that the antenna can communicate with satellites.

In order to establish the inter-region communication, when a remote instance desires to communicate with the antenna 112, a gateway server 130 is provisioned in the source region 110 to establish one or more secure communication channels 132, 134. Likewise, in regions B 140 and C 142, gateway servers 144, 146, respectively, are provisioned. Provisioning of the servers 130, 144, 146, can include launching instances that execute on the server computers or providing software or hardware on server computers as part of a service executing in the region. The provisioning can occur at a predetermined period of time prior to a reservation. The gateway servers 130, 144, and 146 provide secure endpoints in each region as part of the communication channels 132, 134. The servers 130, 144, 146 can have communications there between that are encrypted to ensure security of the data streams. The gateway servers 144, 146 in the destination regions can be coupled to user instances 150, 152. Thus, a communication channel is established between the user instance 150 and the antenna 112 via the gateway servers 130, 144. Likewise, a communication channel is established between the user instance 152 and the antenna 112 via the gateway servers 130, 146. The user instances 150, 152 can thereby receive secure streaming data from the antenna 112 and manage and control the antenna 112 from a remote region.

In one example, a user can have the antenna streaming data being transmitted to two different regions in parallel, as shown in FIG. 1. Additional regions can be added. As described further below, the secure communication channels and access to the antenna 112 can be scheduled in advance from one or more remote regions. The users can have a mission profile wherein configuration parameters of a desired antenna are identified and matched to available antennas. Endpoints can then be established during the scheduled time and secure communication channels established to deliver satellite streaming data to end users in remote regions. Once the scheduled time is completed, the provisioned servers can be terminated, such as by terminating the instances or by terminating any allocation offered by a service.

Figure 2:
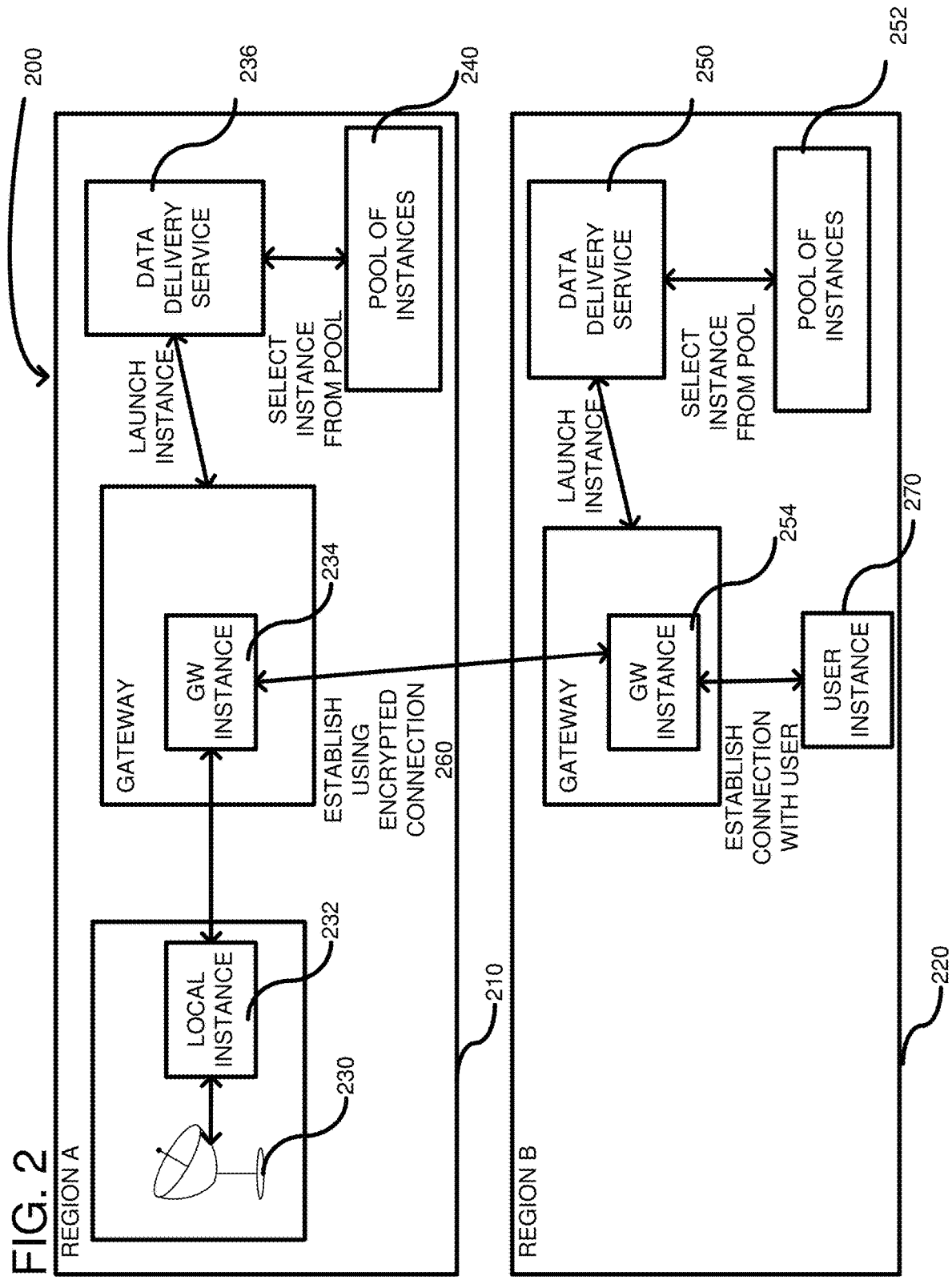
FIG. 2 is another exemplary system according to another embodiment for communication between an antenna and a remote region.

FIG. 2 is another example embodiment of a system 200 having multiple regions including region A 210 and region B 220. Region A 210 is a source region that includes an antenna 230 for communicating with one or more satellites. A local instance 232 can execute on a server computer (not shown) at the antenna location. The instance 232 can be coupled to a gateway instance 234 within region A 210, through a direct connection, such as optical fiber, or through a network connection. The gateway instance 234 is launched by a data delivery service 236 that schedules when an antenna time slot is available and launches the gateway instance 234 in response. The data delivery service 236 launches the gateway instance 234 by selecting an instance from a pool of available instances 240. As explained further below, the pool of available instances can be associated with partitions available on server computers for launching virtual machines in a cloud environment.

A data delivery service 250 is likewise executing in region B 220 and selects an instance to launch from a pool of instances 252. The data delivery service 250 can then launch an instance 254, which establishes a secure communication channel 260 with instance 234. The gateway instances 234, 254 operate as endpoints for each region 210, 220. A user instance 270 executing in region B 220 can be connected through a communication channel to the gateway instance 254. At a scheduled time and for a scheduled duration, a communication channel is opened between the antenna 230, the instance 232, the gateway instance 234, the gateway instance 254 and the user instance 270 so that the user instance 270 can communicate with, control and manage the antenna 230 from a remote region. Once the scheduled time slot has ended, the data delivery service terminates instances 234, 254 so that the communication channel 260 is terminated. Thus, temporary gateway instances 234, 254 are launched and then terminated during a scheduled time slot in which the user instance 270 communicates with antenna 230 to ensure a secure communication channel 260 between the regions 210, 220.

Figure 3:
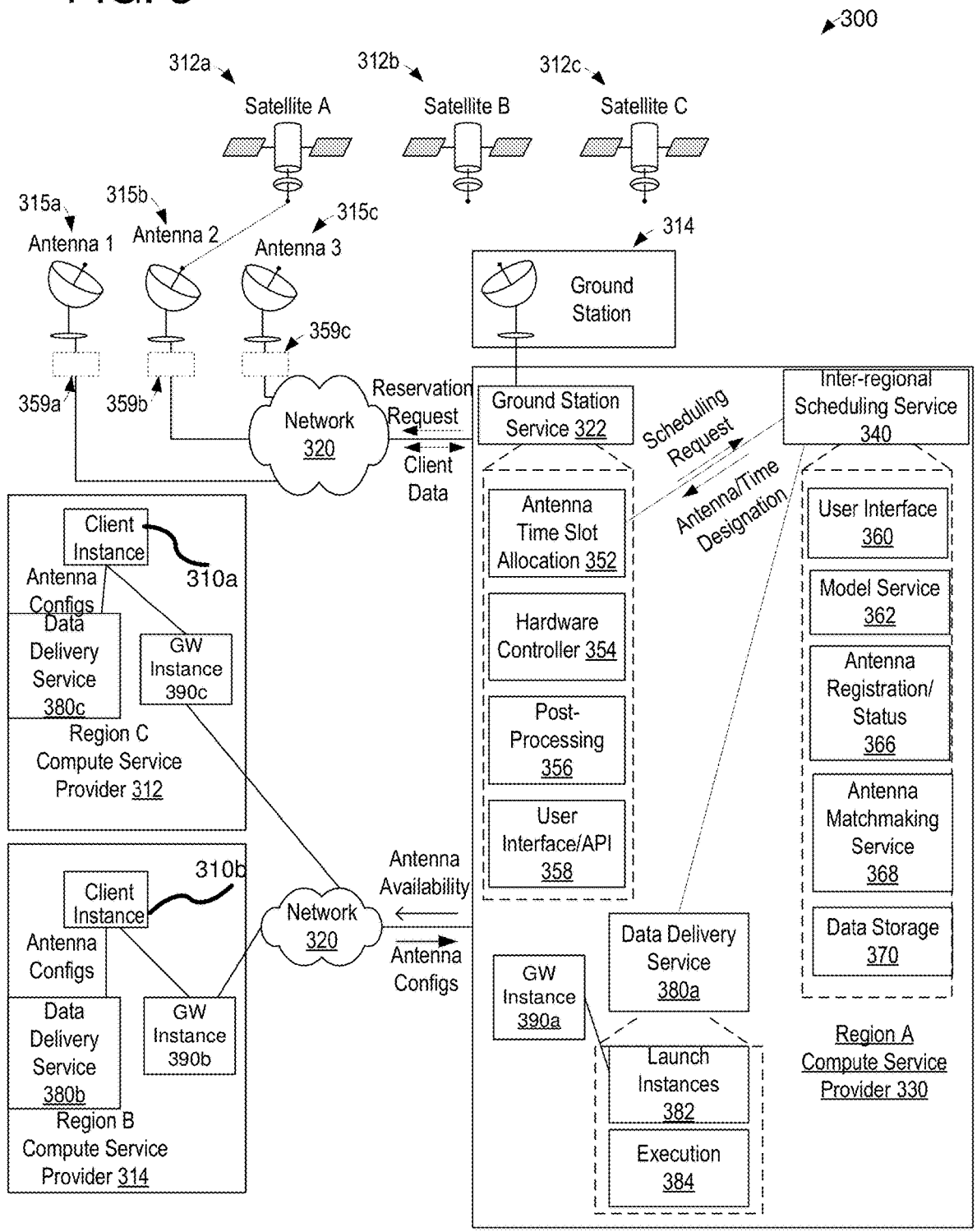
FIG. 3 is another embodiment showing details of a system wherein a data delivery service is used for inter-region delivery of antenna data.

FIG. 3 shows a provider network 300 that allows for multiple clients instances 310*a*-310*b* to communicate with multiple respective satellites 312*a*-312*c* via one or more satellite ground stations 314 utilizing one or more antennas 315*a*-315*c*. Clients 310*a*-310*b* can be respective owners of satellites 312*a*-312*c*, respective operators of satellites 312*a*-312*c*, or any other user of ground station service 314 otherwise authorized to have access to satellites 312*a*-312*c*. The owners or operators of the satellites may be different from the owners and/or operators of the antennas 315*a*-315*c*. Although two clients, three satellites, three antennas, and a single ground station are shown in FIG. 3, any number of clients, satellites, antennas, and ground stations is possible, and embodiments are not limited to the illustrated numbers.

Client instances 310*a*-310*b* can communicate via network 320 with ground station service 322 to schedule communication sessions between satellites 312*a*-312*c* and ground station 314 and receive data from scheduled communication sessions. Client devices associated with the clients 310*a*-310*b* may be a part of the same compute service provider network as the ground station service 322 in some examples.

In other examples, the client devices may be outside of the compute service provider network. Ground station 314 of ground station service 322 can include one or more satellite antennas, software defined radios, and modems to communicate with satellites 312*a*-312*c* and/or antennas 315*a*-315*c* using radio signals. Based on instructions received from clients 310*a*-310*b* at ground station service 322 via a network 320, the ground station 314 can receive, via the ground station's antenna and/or via a designated one of antennas 315*a*-315*c* data downlinked from the satellites 312, monitor health and status of satellites 312, and/or provide commands to perform tasks or uplink data to the satellites.

Network 320 can include any suitable combination of networking hardware and protocols that establish network-based communications with a compute service provider 330. For example, network 320 can comprise the various telecommunications networks and service providers that collectively implement the Internet. Alternatively or additionally, network 320 can include private networks, such as local area networks (LANs) or wide area networks (WANs), and/or public or private wireless networks. For example, a given client 310*a* and compute service provider 330 may each be respectively provisioned within enterprises having their own internal networks (e.g., which are only connected to the compute service provider 330 and are not connected to other networks). In such an example, network 320 can include hardware and software to establish a networking link between client 310*a* and the Internet, and between the Internet and compute service provider 330. In some embodiments, clients 310 may communicate with compute service provider 330 using a direct connection rather than network 320. Although multiple elements (e.g., each of clients 310, antennas 315, etc.) are shown communicating with compute service provider 330 through the network 320, it is to be understood that the representation of a single network 320 is representative, and some or all of the elements may communicate with the compute service provider through different networks operating according to different protocols, having different hardware, etc.

Ground station service 322 can be part of compute service provider 330, which may provide one or more services (such as various types of cloud-based computing or storage) accessible via network 320 to clients 310. For example, compute service provider 330 may include numerous data centers hosting various resource pools, such as collections of physical and/or virtualized computer servers, storage devices, networking equipment and the like (e.g., as described below with respect to computing environment 700 in FIG. 7), that implement and distribute the infrastructure and services offered by the compute service provider 330. In some embodiments, compute service provider 330 can provide computing resources, such as a virtual compute service, data storage service (e.g., block-based storage service or various other storage types, such as object/key-value based data stores or various types of database systems), and/or any other type of network-based service. Clients 310 can access the services offered by compute service provider 330 via network 320. Similarly, the network-based services can communicate with and/or make use of each other to provide different services. For example, computing resources offered to clients in units called "instances," such as virtual or physical compute instances or storage instances, may make use of other resources.

In some embodiments, the ground station service 322 can coordinate with a scheduling service 340, which can also be a part of compute service provider 330, in order to identify an antenna and associated time slot for use in servicing a communication request from a selected client (e.g., an access request from one of clients 310) to communicate with a selected satellite (e.g., one of satellites 312). For example, the ground station service 322 may request that the scheduling service 340 determine and return an antenna designation for a selected antenna that is compatible with and able to service the client's communication request and a time slot during which the selected antenna is available to service the client's communication request.

The dotted line box corresponding to ground station service 322 illustrates a logical view of some of the services and/or modules that may be offered by ground station 314, for example, antenna time slot allocation module 352, ground station hardware controller 354, and user interface 358. In embodiments, the user interface 358 can be a web-based graphical user interface (GUI) or an application programmatic interface (API), for example, when one of the clients 310 programmatically submits the communication request. For example, the API of user interface 358 can function as an endpoint that allows programmatic integration of the ground station service 322 into existing satellite operation systems. Antenna time slot allocation module 352 of the ground station service 322 can convert the antenna and time slot designations returned by the scheduling service 340 into a reservation request for an associated antenna (e.g., one of antennas 315) for communication with the requested satellite.

Upon successful reservation, and at the scheduled time slot, the hardware control module 354 can then translate the communication request into appropriate motor control signals that move the associated antenna (e.g., adjust directionality of the antenna) to point at the requested satellite for communication therewith. For example, the control signals may optionally be sent to control equipment for the respective antennas (e.g., control equipment 359*a* for Antenna 1, control equipment 359*b* for Antenna 2, and/or control equipment 359*c* for Antenna 3). The control equipment for each antenna may include hardware and/or software modules associated with the respective antenna that are configured to receive the reservation request and/or control instructions from the ground station service 322 and operate the respective antenna according to the reservation request/control instructions (e.g., configuring the antenna for a requested communication with a requested satellite at a requested time slot). In response, as shown, the antenna may communicate requested client data from the satellite to the associated client via the compute service provider 330. Although described in consideration of transmitting client data from the satellite to the associated client, it is to be understood that the operations performed herein may similarly facilitate the transmission of command and control signals or other data from the client to the satellite via the selected antenna during the reserved time slot. In some examples, a data plane (e.g., used for communicating client data between a client device and a satellite) may be separate from a control plane (e.g., used for communicating control instructions/data for controlling operation of the antenna).

A post-processing module 356 may be configured to process incoming and/or outgoing client data and/or control data. For example, the post-processing module 356 may be configured to encode/decode, modulate/demodulate, and/or otherwise configure data for communication between the satellite and the client device. The parameters for the post-processing may be based on a client request for communications and/or a configuration of the satellite, antenna, and/or client device used in the associated communication. In some examples, a first portion of the post-processing may be performed at the antenna using one or more antenna components, while a second portion of the post-processing may be performed at the ground station via post-processing module 356. For example, the client data transmitted between the antennas 315 and the compute service provider 330 may include client data that is ready for the client (e.g., demodulated and decoded), client data that has been partially processed for the client (e.g., just demodulated but not decoded), and/or client data that has not been processed for the client (e.g., neither demodulated nor decoded, such as the raw signal output from the satellite).

The dotted line box corresponding to scheduling service 340 illustrates a logical view of services and/or modules that may be offered by scheduling service 340, for example, a user interface 360, a model service 362, an antenna registration/status service 366, an antenna matchmaking service 368, and a data storage service 370. As described above, the scheduling service may be configured to return an antenna and time slot designation for using a selected antenna to communicate with a satellite based on a client request (e.g., from a client, such as one of clients 310, optionally propagated to the scheduling service 340 via ground station service 322) to user interface 360. For example, the user interface 360 can be a web-based GUI when the client request is directly from one of the clients 310. Alternatively, the user interface 360 can be an API, for example, when the client request is from the ground station service 322 in response to a request from one of the clients 310 to ground station service 322 for communication with one of the satellites 312*a*-312*c*. For example, the API of user interface 360 can function as an endpoint that allows programmatic integration of the scheduling service 340 into existing satellite operation systems.

The data storage service 370 can store therein various data and/or models employed by the scheduling service 340 in determining an antenna and time slot for servicing a communication request. The data storage service 370 can provide any type of data storage, such as, but not limited to, a block-based storage service that provides block-storage resources to compute instances of a compute service, an object-based storage service that stores data objects, a cold storage service that provides a low-cost storage solution for infrequently accessed data objects, or a database. In an exemplary embodiment, the data storage service 370 can be a cloud-based nonSQL database service, such as Amazon Web Services (AWS) DynamoDB.

The antenna registration/status service 366 may be configured to coordinate the storage and maintenance of a repository of information for each antenna. For example, when a representative (e.g., an owner, operator, or other representative entity) of an antenna decides to make the antenna available for use by third-party clients to service communication requests between the clients and one or more satellites, the representative may provide registration information to register the antenna with the ground station service 322 and/or the scheduling service 340. In some examples, the registration information may be provided to the ground station service 322 and/or the scheduling service 340 via a network, such as network 320. In some examples, the antenna registration/status service may be called responsive to a request from an antenna representative to register the antenna and/or to update information regarding the antenna. The antenna registration/status service may additionally or alternatively be called responsive to an automated detection that an operational status or other information relating to the antenna has changed.

The antenna matchmaking service 368 can employ a comparison methodology to identify a compatible antenna for a requested communication with a requested satellite. For example, the antenna matchmaking service may extract communication information from a communication request received from a client and apply the extracted information to a model (e.g., generated and maintained by model service 362, described in more detail below) to determine parameters of the communication request that are to be matched with compatible antennas. The antenna matchmaking service 368 may compare these determined parameters to available antennas (based on the registration and status information generated by the antenna registration/status service 366 and/or stored in the data storage service 370) in order to identify antennas that are compatible with the request (e.g., antennas that are able to service the request and are or will be available to service the request).

The antenna matchmaking service 368 may also evaluate available time slots on the identified compatible antennas in order to determine which antenna is available to service the communication request closest to a current time or closest to a requested time for the communication as designated in the communication request from the client. As used in examples herein, the term "next available time slot" may reference an available time slot for a compatible antenna that is closest to a current time or closest to a requested time (or earliest time if the requested time is a time window) for the communication. As further used herein, the term "available" when describing a time slot may reference a time slot that is not yet reserved (e.g., neither reserved for communications by the representative of the antenna nor reserved for communications by a third-party client, such as clients 310). The antenna matchmaking service 368 may output (e.g., to the ground station service and/or to another requesting entity) an indication of the next available time slot and a designation of the antenna (or antennas) that are available during the next available time slot and that are compatible with the communication request (e.g., able to service the communication request).

In some embodiments, the model service 362 is configured to generate or update models used in deriving client communication parameters from communication request information and used in deriving compatible antenna features for a given set of communication parameters. For example, the model service 362 can use data from historical antenna/communication request matches to update a model, which updated model can then be globally applied for subsequent antenna/communication request matchmaking processes. The aggregation of data from historical matches across multiple clients and antennas thus allows the scheduling service 340 to achieve a matchmaking accuracy that would otherwise be unattainable by clients 310 determining an antenna match independently.

In order to ensure secure connections between the antennas 315 and the client instances, 310, a data delivery service 380a-380c can be executed in each region A, B and C. The data delivery services 380b and 380c can receive antenna configurations from the clients 310 that include a desired antenna to be scheduled. The antenna configurations can include an antenna downlink configuration, which identifies a frequency and bandwidth for receiving data, an antenna uplink configuration, which identifies a frequency and bandwidth for transmitting data, a tracking configuration, which sets autotracking, etc. A wide variety of antenna configurations can be specified depending upon the particular hardware being used. The antenna configurations can be transmitted via the network 320 to the data delivery service 380a, which uses the antenna configurations in cooperation with the scheduling service 340 in order to schedule time slots for the antennas 315. Specifically, the antenna matchmaking service 368 can use the antenna configurations from the clients 310 in order to determine antennas that match the antenna configurations provided by the clients 310. Once a schedule determination is made, a reservation can be sent from the data delivery service 380a to the clients 310. A few minutes before the reservation commences, the data delivery service 380a uses a launch-instance module 382 to launch a gateway instance 390a, for each client in the reservation. Corresponding gateway instances 390b, 390c are launched in regions B and C. As described above, the instances 390 can be replaced by server computers. For example, a service can be used in place of the instances 390. The connection between gateway instance 390a to 390b is a single port-to-port communication line such that only a single flow of traffic is managed per port to increase security. Likewise, a single port on gateway instance 390a and gateway instance 390c is used to establish communications between the gateway instance 390a and gateway instance 390c. The gateway instance 390a is also coupled to the ground station service 322 to establish a communication channel between the gateway instance 390a and one of the antennas 315. After the data delivery service 380b launches instance 390b, it establishes a port-to-port communication channel with client instance 310b. The data delivery service 380c also establishes a communication channel between the gateway instance 390c and the client instance 310a. At the appropriate scheduled time, the data delivery service 380a uses an execution module 384 to allow communication to pass through the gateway instances 390a, 390b, 390c. Once the schedule has been completed, the data delivery service 380a can use the execution module 384 to tear down the connections. Thus, the data delivery service 380 manages a single communication flow on each port. Likewise, the data delivery service 380 can ensure that packets passing through the gateway instances 390 are encrypted for security across the network 320.

In some embodiments, the data delivery service 380 can instantiate one or more gateway instances 390 using virtualized compute resources of another service of a compute service provider 330 that includes the ground station service 322. For example, a virtual compute instance can be implemented on one or more resource hosts included in a data center that comprises one or more servers with a specified computational capacity (e.g., indicated by the type and number of central processing units (CPUs), memory size, etc.) and a specified software stack (e.g., a particular version of an operating system, which may run on top of a hypervisor). In different embodiments, various computing devices can be employed alone or in combination to implement the compute instances of virtual compute services (e.g., the data delivery service 380, the ground station service 322 and/or scheduling service 340), including special purpose computer servers, storage devices, network devices, etc.

The antennas described herein may include single-access antennas (e.g., antennas that are configured to communicate data between a satellite and one client device at a time and/or otherwise communicate with client devices in a time division multiplex configuration). In other examples, the antennas described herein may include multi-access antennas (e.g., antennas that are able to communicate data between one or more satellites and a plurality of client devices simultaneously). For example, the antennas described herein may include phased array antennas that can form multiple beams that can be steered independently to send/receive data to/from multiple clients and/or satellites at the same time. The example processes described herein may be adapted for multi-access antennas by performing operations for multiple client devices and/or satellites. For example, scheduling operations may be performed for identifying time slots that can accommodate multiple communication requests and/or requests for communicating data to/from multiple client devices and/or satellites. As another example, the ground station hardware controller 354 may be configured to send control instructions relating to the formation of multiple beams for steering data to/from multiple client devices and/or satellites. The configuration of an antenna as a single-access or multi-access antenna may be included in the registration data of the antenna and may be an example of a registered capability of the antenna.

Figure 4:
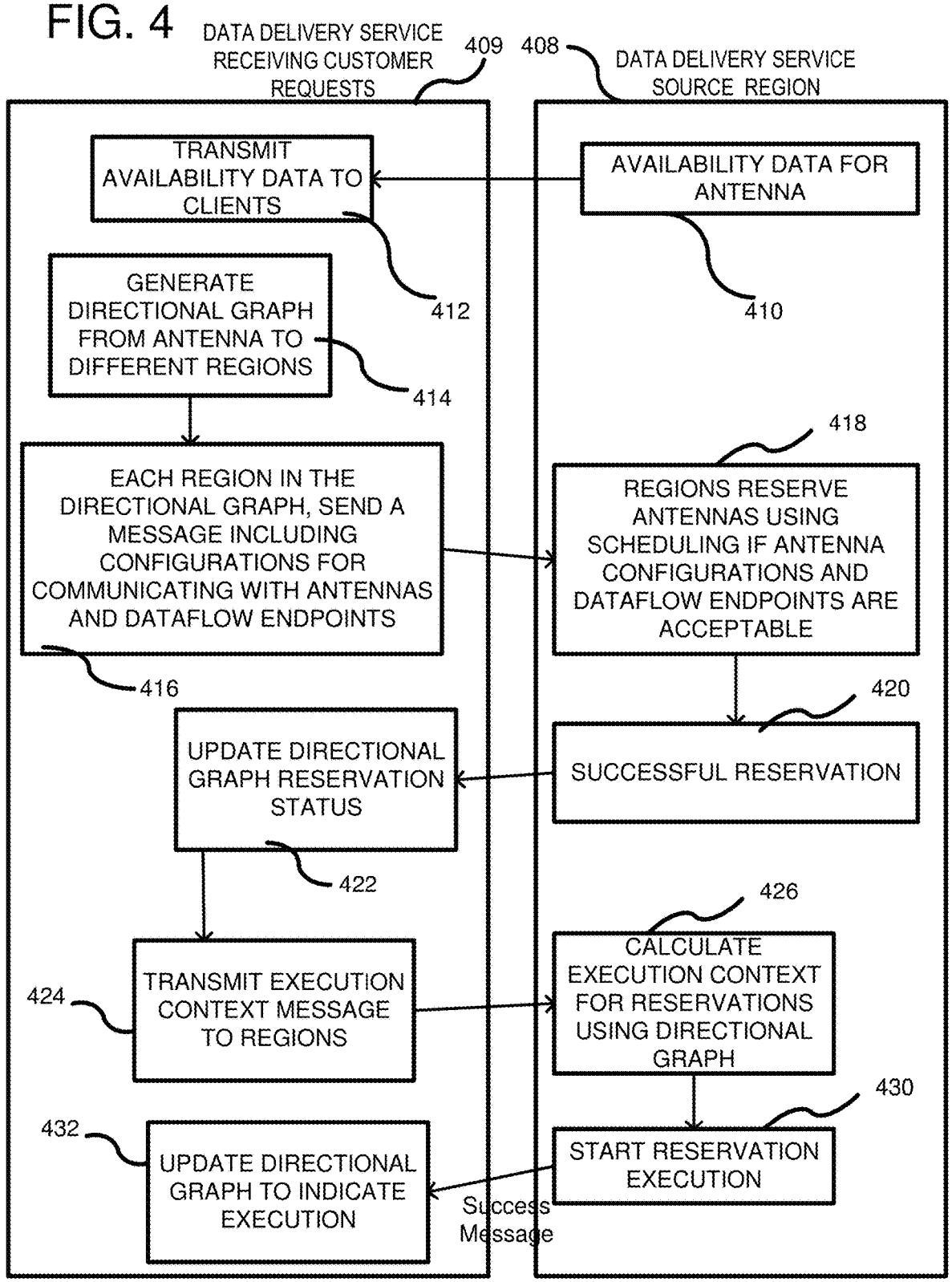
FIG. 4 is a flow chart for scheduling inter-region transmission of antenna data.

FIG. 4 is a flowchart according to one embodiment for matching available antennas to clients. In process block 410, availability data for various antenna is delivered from a data delivery service 408 of a source region associated with the antenna (e.g., a region containing a ground station, such as Region A in FIG. 3 having ground station 314) to a data delivery service 409 in a remote region. The availability data can include frequency, bandwidth, protocol, etc. associated with the antenna. The availability data can also include availability of the user instance to receive the antenna data. In process block 412, the availability data can be transmitted to clients so that the clients can select candidate antennas for connection. In process block 414, a directional graph can be generated indicating available antenna connections to different regions. The directional graph can be a directed acyclic graph (DAG), as one example, wherein the nodes represent the antenna capabilities used (e.g., uplink configurations, downlink configurations, demodulate configurations, decode configurations, etc.) and the edges represent how data flows for each antenna capability to the user (e.g., a server or a database). The edges can be transmitted through the data delivery service and can be within the same region or different regions. In process block 416, for each region in the directional graph, messages are sent including configurations for communicating with antennas and dataflow endpoint information. In process block 418, the regions receive the configuration information messages and use the information to reserve antennas. At process block 420, a message indicating a successful reservation is transmitted to the remote region 409. The data delivery service in the remote region updates the directional graph reservation status (process block 422). At process block 424, an execution context message is transmitted to the regions to prepare for executing the communication. In process block 426, the execution context is calculated for reservations to update the directional graph. At 430, the reservation execution is started which establishes a communication channel between the regions. In process block 432, the directional graph can be updated to indicate that the execution has begun. The directional graph can be shared between the different regions 408, 409. Execution between the regions can be implemented using the execution module 384 (FIG. 3).

Figure 5:
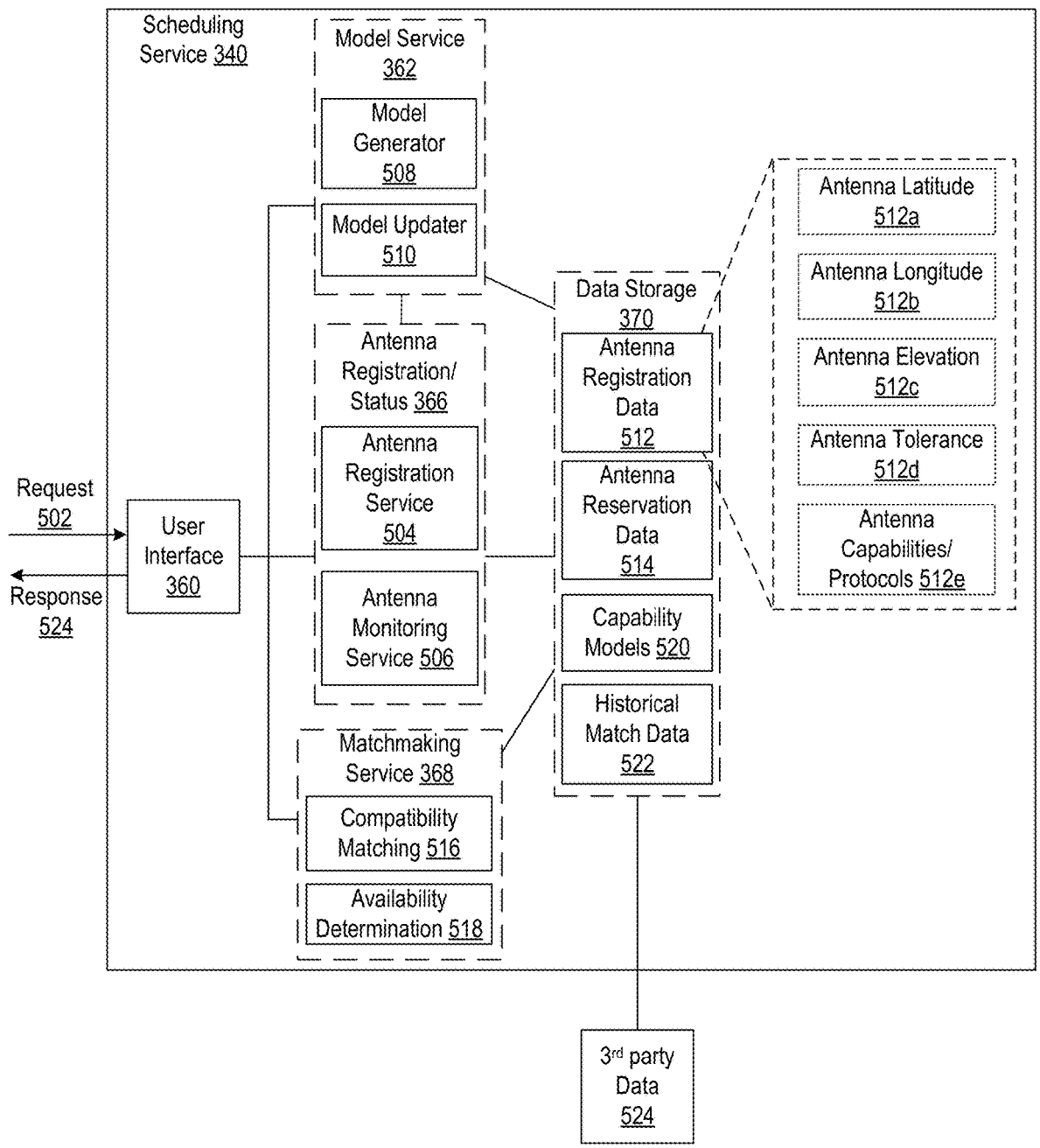
FIG. 5 is an example embodiment of a scheduling service for scheduling antenna time slots.

FIG. 5 illustrates additional details of the scheduling service 340, described above with respect to FIG. 3. The scheduling service 340 can receive a request 502 including information usable to facilitate the scheduling of communications between a client and a satellite using available time on one or more remote antennas. The request 502 may be received from the data delivery service (380a, FIG. 3). In some embodiments, initial processing may be performed on the request 502 to parse the request and intelligently forward relevant portions of the request to different services, such as the model service 362, the antenna registration/status service 366, and/or the matchmaking service 368. In other embodiments, the request 502 may be passed along to the above services without processing (or with minimal processing, such as to convert the request to a format that is compatible with the associated services).

In some embodiments, the request 502 may be a communication request for exchanging data between a client and a satellite. For example, the request may include any information that sufficiently identifies the satellite with which communication is requested, as described above. The request 502 may be received from the client requesting the satellite communication. In some embodiments, the request may further include parameters for a requested communication session between the client and the satellite (e.g., protocols to be used during communication, data rate, signal modulation, and delay requests/thresholds, amount/type of data to be communicated, which may include expected uplink and downlink data amounts/timing/etc., requested length/timing of communication with the satellite, and/or other parameters). In additional or alternative embodiments, one or more parameters of the requested communication may be derivable from other information in the request 502.

In other embodiments, the request 502 may include a request to register or update antenna information. For example, the request 502 may include identification information for the antenna, location/telemetry information for the antenna, operating status information for the antenna, configuration/capabilities information for the antenna, etc.

In examples where the request 502 includes a request to register or update antenna information, the request and/or information derived therefrom may be provided to the antenna registration/status service 366. The antenna registration/status service 366 may include an antenna registration service 504 and an antenna monitoring service 506. The antenna registration service 504 may be called to parse antenna information for an identified antenna as received in a registration request and generate or update a record associated with the identified antenna. For example, the antenna registration service 504 may update antenna registration data 512 to include and/or update information relating to the identified antenna. The registration data may include antenna location data (e.g., antenna latitude 512a, antenna longitude 512b, and antenna elevation 512c), antenna tolerance 512d, antenna capabilities/protocols 512e, and/or other antenna information (e.g., antenna operating status information, etc.). The registration data for each registered antenna may be stored in association with an identifier for the respective antenna. In some examples, antenna capabilities that are registered may be classified as having an associated type, which is used for matching the capabilities to communication parameters relating to client requests for communication. The capability type may be provided by the antenna representative as part of the registration or determined/assigned by the antenna registration service 504. For example, capability models 520 may include one or more models configured to model capabilities of the antenna based on the received registration information for the antenna.

The antenna registration service 504 may also be configured to perform a control qualification process based on credentials for controlling the antenna and/or configuration information for the antenna received in an antenna registration request. The control qualification process may include verifying whether the antenna has provided sufficient information to allow the ground station to control the antenna according to a reservation and/or whether the antenna is configured in a manner that is able to be controlled by the ground station according to a reservation. If the verification is successful, a flag indicating that the antenna is able to be controlled by the ground station may be stored in associated with an identifier of the antenna in the antenna registration data 512. If the verification is not successful (e.g., the ground station determines that the available configuration information for the antenna is incomplete or incompatible with the ground station such that the ground station is not able to control the antenna), the ground station may request additional information and/or request that the antenna employs a supported control scheme that is compatible with the ground station.

If the information in the request 502 pertains to an antenna that is already registered, the antenna monitoring service 506 may be called to handle the updating of existing information for a selected antenna based on the information in the request. In some examples, the antenna monitoring service 506 may also generate requests for status update information, which are sent outward to a ground station or other connected element that is in communication with an antenna of interest. The antenna monitoring service 506 may be configured to generate such update requests responsive to detecting an event (e.g., an event that may affect an associated antenna, such as a weather event) and/or responsive to a time threshold being met (e.g., where the time threshold corresponds to an amount of time that has passed since a last update of information on the antenna). The antenna monitoring service 506 may additionally or alternatively request updated status information responsive to an identification of a satellite as a candidate for servicing a communication request.

An antenna registration or update request may additionally or alternatively include antenna reservation information, such as a time window for which communications between clients and satellites are allowed (e.g., time windows when the antenna owner will allow a ground station to take over control of the antenna to service communication requests from third party clients). Antenna reservation information may also include current/upcoming reservations that have already been made to reserve use of the antenna, or other indications of time during which a reservation for servicing a client communication request cannot be made and/or during which the antenna owner does not allow the antenna to be controlled to service communication requests from the third-party clients. The antenna reservation information may be stored in antenna reservation data 514 to update information for an existing antenna or to create a new entry for a newly-registered antenna.

In examples where the request 502 includes a communication request for exchanging data between a client and a satellite, the request may be provided to and/or used to call the matchmaking service 368. The matchmaking service 368 may include a compatibility matching module 516, configured to match the request to one or more antennas that are able to service the request, and an availability determination module 518, configured to determine available time slots for the compatible antennas identified by the compatibility matching module 516 and to identify one of the available time slots as a next available time slot for the communication request.

The compatibility matching module 516 may apply information from the communication request (or information derived from the request 502) to one or more capability models 520. For example, the one or more capability models 520 may include one or more communication models that are configured to model parameters of the communication request and determine capabilities of antennas that are compatible with (e.g., able to service/meet the parameters of) the communication request. The compatibility matching module 516 may further compare the modeled parameters to capabilities and features of the antennas, as identified in the antenna registration data 512, to determine a subset of the registered antennas, where the antennas in the subset are compatible with the communication request and the antennas outside of the subset are not compatible with the communication request and/or do not have available time slots for the communication request. In some examples, one or more of the antennas included in the subset may be determined based on an evaluation of historical match data 522 pertaining to the client that issued the communication request and/or other parameters of the communication request.

The availability determination module 518 may query the antenna reservation data 514 in order to determine available time slots for each antenna in the subset identified by the compatibility matching module 516. In some examples, the availability determination module 518 may be configured to continuously update the antenna reservation data 514 to maintain a schedule of time slots for at least a portion of the registered antennas. In such examples, the availability determination module 518 may be called to access the schedule and identify available time slots for selected antennas (e.g., the antennas identified in the subset by the compatibility matching module 516 as described above). In some examples, the availability determination module 518 may be called during the processing performed by the compatibility matching module 516 to eliminate from consideration antennas that are registered but have no availability to handle communications between client devices and satellites.

In some examples, the model service 362 can include a model generation service (model generator) 508, which may be configured to generate one or more models for use by the matchmaking service 368 (e.g., the compatibility matching module 516). For example, the model generation service 508 may receive or retrieve specific data indicative of client-related parameters and antenna parameters to generate models of clients' instances to which data is to be delivered, as well as antenna systems used to deliver data to/from a satellite per a client request. In some embodiments, the data is provided as part of an initial request 502 and forwarded for use by the model generation service 508. Alternatively or additionally, the data is provided to the scheduling service 340 as part of an initial setup or intake by the client. In some examples, the model generation service 508 uses the specific data from a communication request and/or other data indicating a processing chain to be completed for a given communication request to determine one or more models unique to the client request and to store the models. In other examples, the models may be pre-defined and/or otherwise based on earlier-received data from the client devices and/or other sources.

For example, as described above, antenna representatives may register antenna capabilities that are classified according to associated types, while client communication requests may have configurations that are mappable to the types of capabilities of the antennas (e.g., indicating how a given type of capability may be configured for communicating with a satellite associated with the communication request). The client communication request may include or be used to derive a mission profile, where configurations are defined for the communication (e.g., receiving radiofrequency [RF] signals, demodulating the RF signals, decoding the demodulated RF signals, delivering data to an instance running on a client device associated with the client, etc.). For example, the mission profile may stitch together configurations in a directed acyclic graph or other ordering or sorting construct. The model generation service 508 may use this information to model a client's communication parameters. The model generation service 508 may further model what each registered antenna is capable of servicing using the antenna registration data. In this way, the output of the models for the client communication parameters and the antenna capabilities may be used to match client communication requests with compatible antennas (e.g., the compatibility matching module 516 may utilize the models to determine antennas that can service a particular configuration of a communication request).

Each capability of an antenna has an amount of time it takes to configure the capability, prior to start of contact, as well as an amount of time it takes to clean the configuration up and reset the capability to some base value after the contact is over. The model generation service 508 may also generate models defining these set up and tear down times. During matchmaking for a given communication request, the maximum set up and tear down time from the capabilities that are used for a given communication request are added to a time length of the requested communication to determine a time length of a time slot to be reserved (e.g., used by the availability determination module 518 to determine if a compatible antenna has at least one time slot available that is long enough to service the request, including the maximum set up and tear down times). For multi-access antennas, n set up and tear down times may be determined, where n is the number of client devices requesting to communicate during a time slot, and the total time it takes to set up and tear down communications for the n client devices is included in the calculation of the time length of the time slot. In this way, the system may ensure that resources of the antenna are not used by multiple clients at the same time (for single-access antennas) or otherwise by more clients than are able to be serviced simultaneously (for multi-access antennas).

Alternatively or additionally, model service 362 can include a model update service 510, which can be configured to update one or more models for use by the matchmaking service 368. In some embodiments, the model update service 510 can update a global model after each determination of an antenna and/or time slot to service a client request, for example, to optimize the global model. In some embodiments, the model update service 510 can periodically update the global model based on multiple prior determinations of antenna and/or time slot matches for client requests, for example, to optimize the global model. Other optimization techniques are also possible according to one or more contemplated embodiments.

Figure 6:
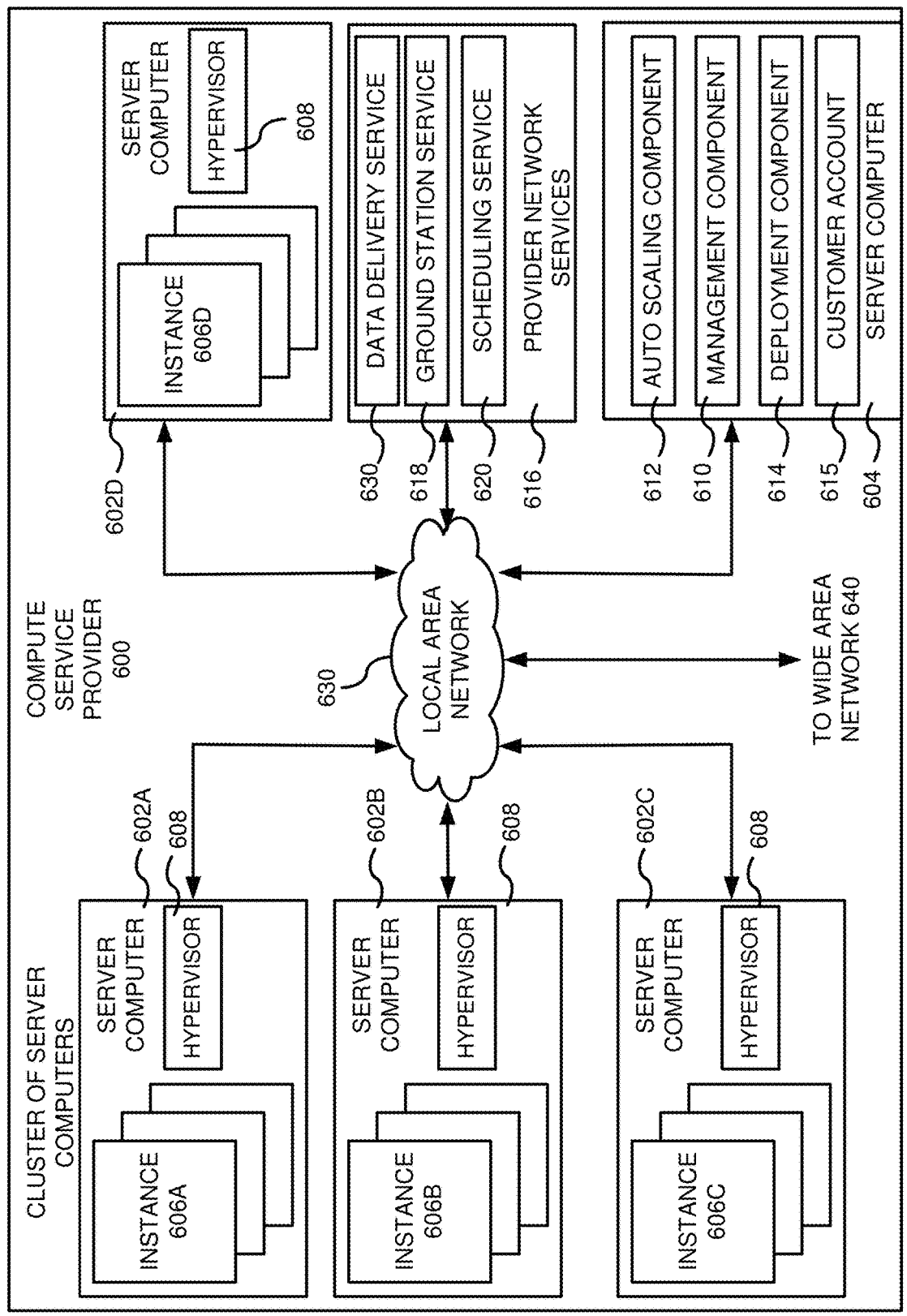
FIG. 6 is an example system diagram showing a plurality of virtual machine instances running in the multi-tenant environment and a service executing for delivering inter-regional antenna data.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of clients operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A client can access the management component 610 to configure various aspects of the operation of the instances 606 purchased by the client. For example, the client can purchase, rent or lease instances and make changes to the configuration of the instances. The client can also specify settings regarding how the purchased instances are to be scaled in response to demand. The management component can further include a policy document to implement client policies. An auto scaling component 612 can scale the instances 606 based upon rules defined by the client. In one embodiment, the auto scaling component 612 allows a client to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist clients in the deployment of new instances 606 of computing resources. The deployment component can have access to account information associated with the instances, such as who is the owner of the account, credit card information, country of the owner, etc. The deployment component 614 can receive a configuration from a client that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the client-provided configuration and cache logic to configure, prime, and launch new instances 606. The configuration, cache logic, and other information may be specified by a client using the management component 610 or by providing this information directly to the deployment component 614. The instance manager can be considered part of the deployment component.

Client account information 615 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, etc.

Examples of provider network services 616 that may be offered by the compute service provider 600 include a ground station service 618, a scheduling service 620, and a data delivery service 630. For example, the ground station service 618 may be implemented by a ground station, such as ground station 314 of FIG. 3. The scheduling service 620 may be implemented by the ground station and/or another device of the compute service provider network to which the ground station belongs (e.g., to perform operations as described with respect to scheduling service). In this way, the provider network services 616 may provide antenna orchestration services, as described herein, to allow one or more client devices to communicate with a satellite using a third-party antenna, where such communications may be at least partially coordinated and controlled by the compute service provider 600. The data delivery service 630 can use the scheduling service to schedule inter-region antenna usage, use the deployment component 614 when launching instances on the different regions, and use the ground station service 618 when executing communication channels between the satellites and the user instances. Other variations can be implemented. For example the ground station service 618 can independently create communication channels between the satellites and user interfaces over the communication channels created by the data delivery service 380a.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
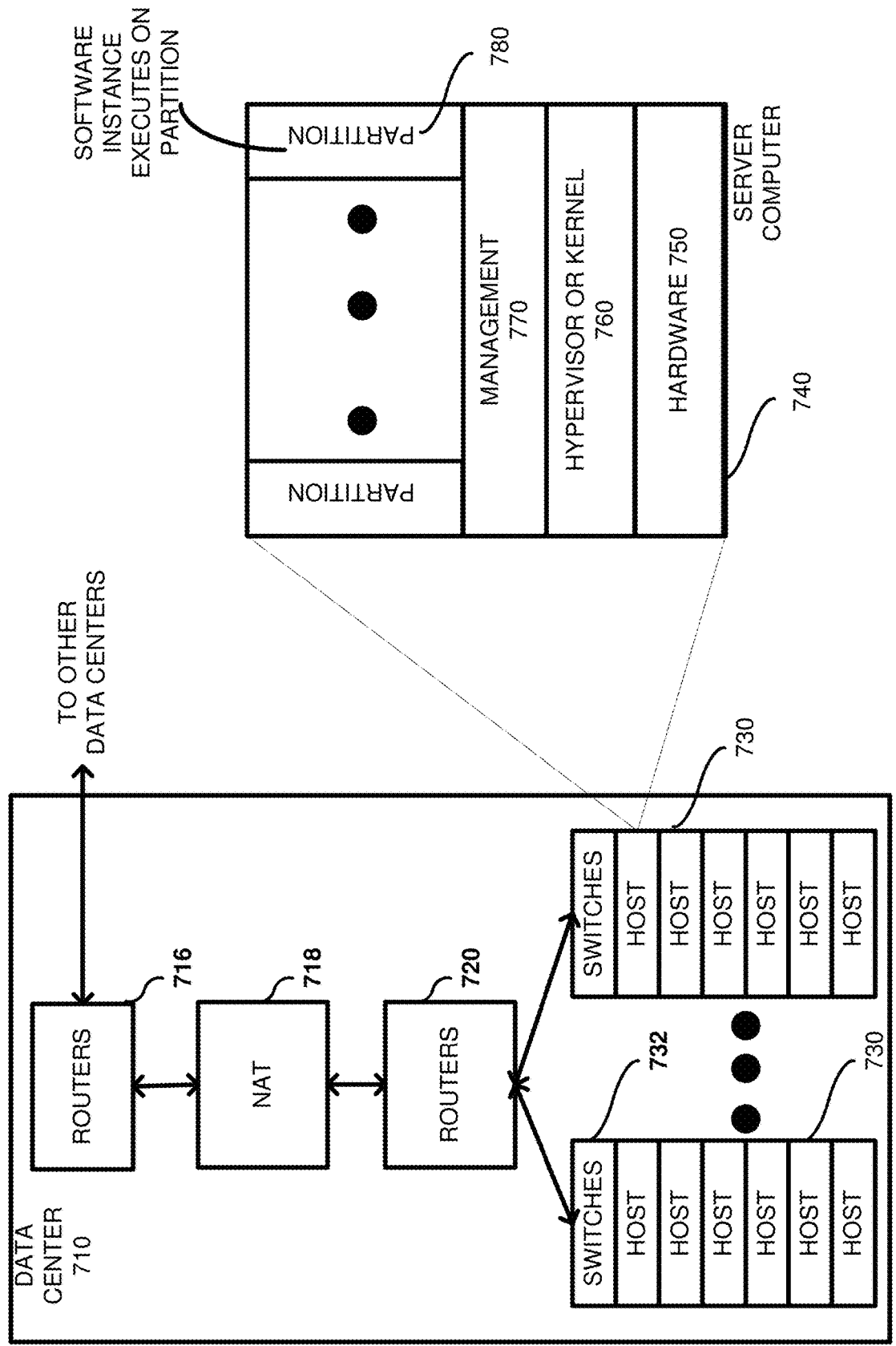
FIG. 7 shows an example of a plurality of host computers, routers and switches, which are hardware assets used for running virtual machine instances.

FIG. 7 illustrates the network of partitions and the physical hardware associated therewith. The network of partitions can include a plurality of data centers, such as data center 710, coupled together by routers 716. The routers 716 read address information in a received packet and determine the packet's destination. If the router decides that a different data center contains a host server computer, then the packet is forwarded to that data center. If the packet is addressed to a host in the data center 710, then it is passed to a network address translator (NAT) 718 that converts the packet's public IP address to a private IP address. The NAT also translates private addresses to public addresses that are bound outside of the datacenter 710. Additional routers 720 can be coupled to the NAT to route packets to one or more racks of host server computers 730. Each rack 730 can include a switch 732 coupled to multiple host server computers. A particular host server computer is shown in an expanded view at 740.

Each host 740 has underlying hardware 750 including one or more CPUs, memory, storage devices, etc. Running a layer above the hardware 750 is a hypervisor or kernel layer 760. The hypervisor or kernel layer can be classified as a type 1 or type 2 hypervisor. A type 1 hypervisor runs directly on the host hardware 750 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 770 can be part of the hypervisor or separated therefrom and generally includes device drivers needed for accessing the hardware 750. The partitions 780 are logical units of isolation by the hypervisor. Each partition 780 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. The partitions 780 can be used when launching the gateway instances, such as the gateway instances 130, 144, 146, of FIG. 1.

Figure 8:
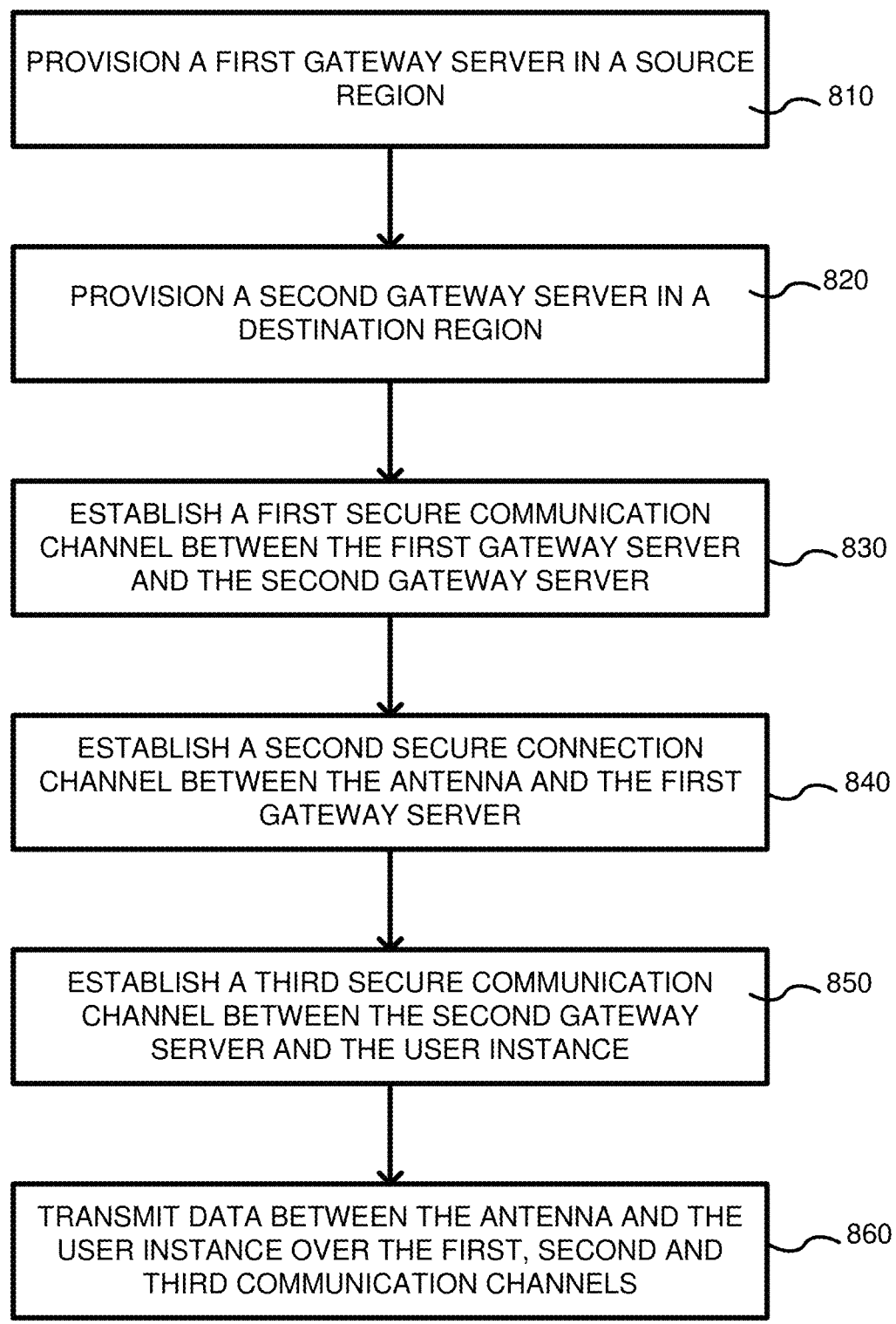
FIG. 8 is a flowchart according to one embodiment for communicating between a user and a remote antenna.

FIG. 8 is a flowchart according to one embodiment for communicating between a user instance and a remote antenna. In process block 810, a first gateway server is provisioned in a source region. For example, turning to FIG. 1, a first gateway server can be server 130 provisioned in Region A 110 in which the antenna 112 is located. Provisioning of the server can include launching an instance on the server or allocating resources of a service, which can include multiple server computers. In process block 820, a second gateway server is provisioned in a destination region. For example, in FIG. 1, the gateway server 144 is provisioned in the destination Region B 140. Process blocks 810, 820 can occur in either order or in parallel. In process block 830, a communication channel is established between the first and second gateway servers. For example, a secure communication channel 132 is established in FIG. 1 between servers 130, 144. In process block 840, a second secure communication channel is established between the antenna and the first gateway server. For example, in FIG. 1, the connection between the local instance 120 and the gateway server 130 is a secure communication channel. In process block 850, a third secure communication channel is established between the second gateway server and the user instance. For example, in FIG. 1, a secure communication channel is established between the gateway server 144 and the user instance 150. Finally, in process block 860, data is transmitted between the antenna and user instance over the secure communication channels.

Figure 9:
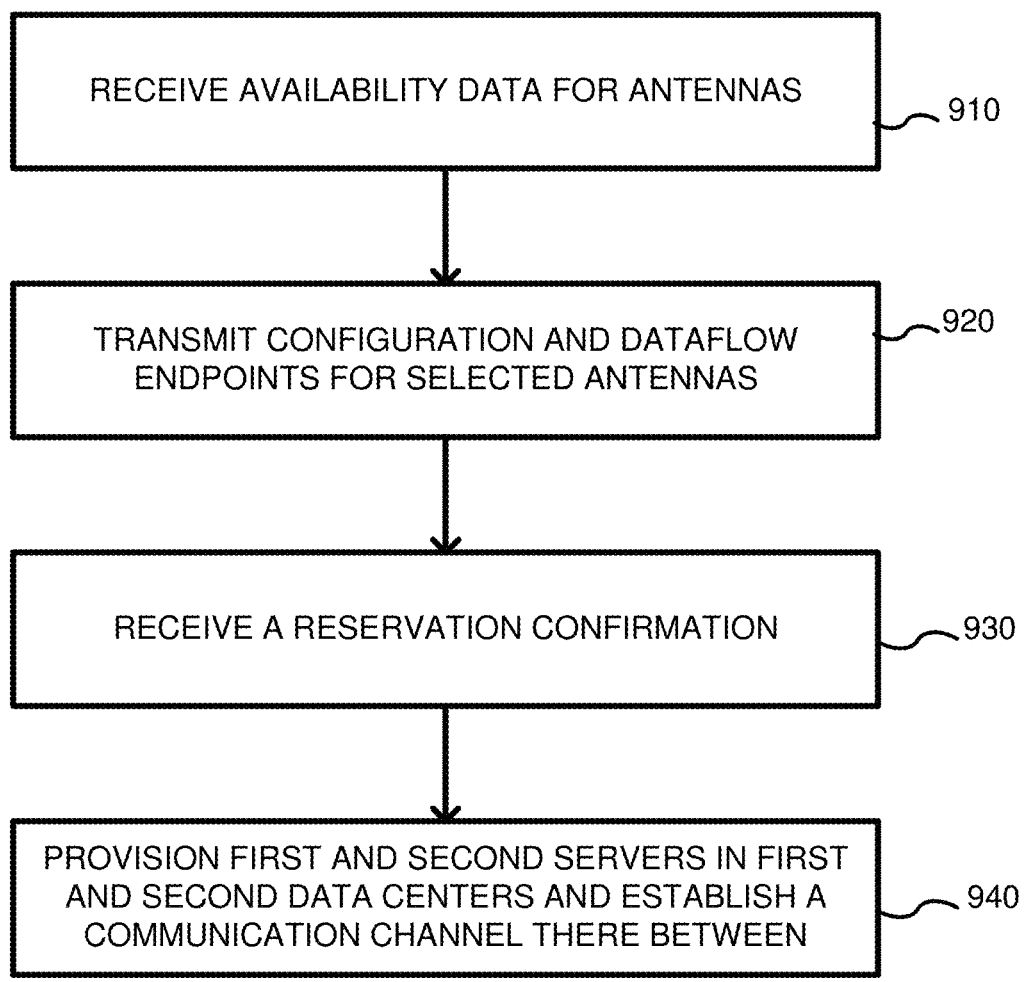
FIG. 9 is a flowchart according to another embodiment for communicating between a user and a remote antenna.

FIG. 9 is a flowchart according to another embodiment for communicating between a user instance and a remote antenna. In process block 910, availability data is received for antennas. For example, in FIG. 4, availability data 410 associated with the antennas is received in a data center 409. The availability data can then be passed onto clients so that the clients can determine which antennas are available at which time slots. In process block 920, configuration and dataflow endpoints are transmitted for selected antennas. For example, clients can select desired configurations (e.g., downlink configurations, uplink configurations, etc.) and the dataflow endpoints, as was shown at 416 in FIG. 4. In process block 930, a reservation confirmation is received. For example, in FIG. 4, after antennas are reserved that match the configurations received, a successful reservation message (420) is received at block 422, which is used to update the directional graph. In process block 940, first and second servers are provisioned (e.g., allocated or launched) in different data centers and a communication channel is established between the first and second servers. For example, in FIG. 1, the gateway servers 130, 144 have a secure communication channel 132 established there between. In FIG. 2, instances 234, 254 have a secure communication there between.

Figure 10:
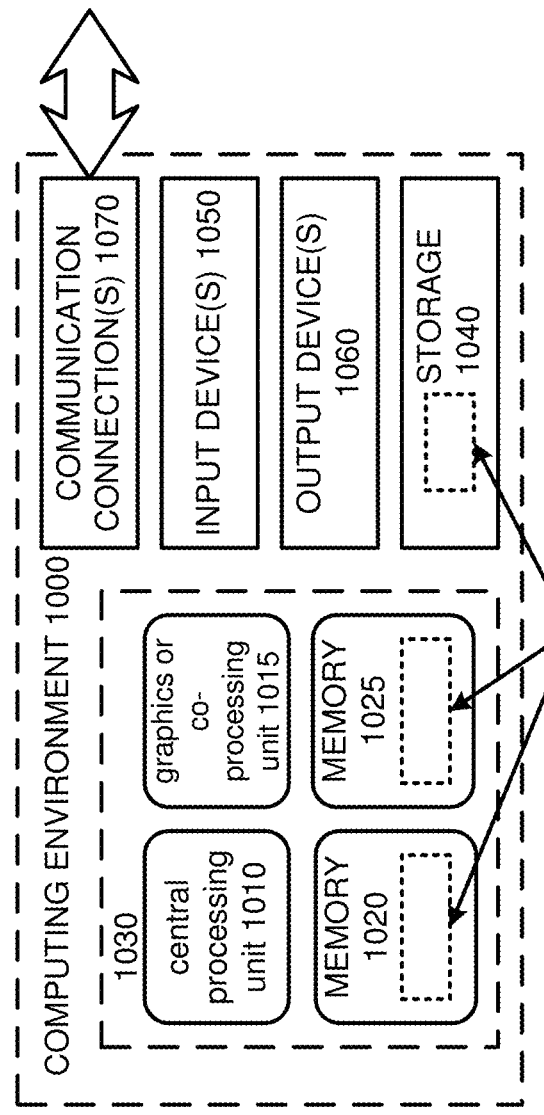
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, the data delivery service described herein can be software 1080.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer-implemented method of connecting an antenna, for communication with a satellite, to a remote region, the method comprising:
   receiving a scheduling request for a reservation of the antenna to allow for exchanging data between a client computer and the satellite;
   performing a control qualification to verify that the antenna is configured to be controlled by a ground station in accordance with the request for the reservation;
   configuring the antenna to be controlled in accordance with the request for the reservation, and confirming the reservation including an identifier of the antenna, a protocol to use in the communication and a time of the reservation;
   wherein the method further comprises transmitting the scheduling request to an antenna registration service that determines location data of the antenna and the protocol used to communicate with the antenna.

2. The computer-implemented method of claim 1, wherein the scheduling request comprises one or more of the following parameters: the protocol to use when exchanging the data between the client computer and the satellite; a data rate; a length of time to communicate with the satellite; and an amount of data to exchange with the satellite.

3. The computer-implemented method of claim 2, wherein the method further comprises matching the parameters to the antenna and determining whether the antenna is compatible with the scheduling request.

4. The computer-implemented method of claim 1, wherein the method further comprises performing a control qualification to determine if credentials associated with the scheduling request are authorized to control the antenna.

5. The computer-implemented method of claim 4, wherein the control qualification comprises time windows when an antenna owner allows the ground station to take control over the antenna.

6. The computer-implemented method of claim 1, wherein the method further comprises:
   in response to the scheduling request of the antenna, provisioning a first gateway server in a source region in which the antenna is located;
   provisioning a second gateway server in a destination region in which the client computer is executing;
   establishing a first secure communication channel between the first gateway server and the second gateway server;
   establishing a second secure communication channel between the antenna and the first gateway server;
   establishing a third secure communication channel between the second gateway server and the client computer; and
   transmitting data between the antenna and the client computer over the first, second, and third communication channels.

7. The computer-implemented method of claim 1, wherein the method further comprises:
   scheduling a time slot for transmitting the data between the antenna and a user instance associated with the client computer, wherein the time slot is associated with the reservation.

8. The computer-implemented method of claim 1, wherein the method further comprises:
   in response to the scheduling request, performing a matchmaking service to match the scheduling request to a plurality of available antennas.

9. A computer-implemented method of connecting an antenna, for communication with a satellite, to a remote region, the method comprising:
   receiving a scheduling request for a reservation of the antenna to allow for exchanging data between a client computer and the satellite;
   performing a control qualification to verify that the antenna is configured to be controlled by a ground station in accordance with the request for the reservation;
   configuring the antenna to be controlled in accordance with the request for the reservation; and
   confirming the reservation including an identifier of the antenna, a protocol to use in the communication and a time of the reservation;
   wherein the method further comprises performing a control qualification to determine if credentials associated with the scheduling request are authorized to control the antenna;
   wherein the control qualification comprises time windows when an antenna owner allows the ground station to take control over the antenna.

10. The computer-implemented method of claim 9, wherein the scheduling request comprises one or more of the following parameters: the protocol to use when exchanging the data between the client computer and the satellite; a data rate; a length of time to communicate with the satellite; and an amount of data to exchange with the satellite.

11. The computer-implemented method of claim 10, wherein the method further comprises matching the parameters to the antenna and determining whether the antenna is compatible with the scheduling request.

12. The computer-implemented method of claim 9, wherein the method further comprises transmitting the scheduling request to an antenna registration service that determines location data of the antenna and the protocol used to communicate with the antenna.

13. The computer-implemented method of claim 9, wherein the method further comprises:
  scheduling a time slot for transmitting the data between the antenna and a user instance associated with the client computer, wherein the time slot is associated with the reservation.

14. The computer-implemented method of claim 9, wherein the method further comprises:
  in response to the scheduling request, performing a matchmaking service to match the scheduling request to a plurality of available antennas.

15. A computer-implemented method of connecting an antenna, for communication with a satellite, to a remote region, the method comprising:
  receiving a scheduling request for a reservation of the antenna to allow for exchanging data between a client computer and the satellite;
  performing a control qualification to verify that the antenna is configured to be controlled by a ground station in accordance with the request for the reservation;
  after the antenna is configured to be controlled in accordance with the request for the reservation, confirming the reservation including an identifier of the antenna, a protocol to use in the communication and a time of the reservation;
  in response to the scheduling request, performing a matchmaking service to match the scheduling request to a plurality of available antennas.

16. The computer-implemented method of claim 15, wherein the scheduling request comprises one or more of the following parameters: the protocol to use when exchanging the data between the client computer and the satellite; a data rate; a length of time to communicate with the satellite; and an amount of data to exchange with the satellite.

17. The computer-implemented method of claim 16, wherein the method further comprises matching the parameters to the antenna and determining whether the antenna is compatible with the scheduling request.

18. The computer-implemented method of claim 15, wherein the method further comprises transmitting the scheduling request to an antenna registration service that determines location data of the antenna and the protocol used to communicate with the antenna.

19. The computer-implemented method of claim 15, wherein the method further comprises:
  scheduling a time slot for transmitting the data between the antenna and a user instance associated with the client computer, wherein the time slot is associated with the reservation.

* * * * *